Oct. 27, 1970  C. L. MEEHAN ET AL  3,536,281
BRACKET STRUCTURE
Filed Jan. 4, 1968  2 Sheets-Sheet 1
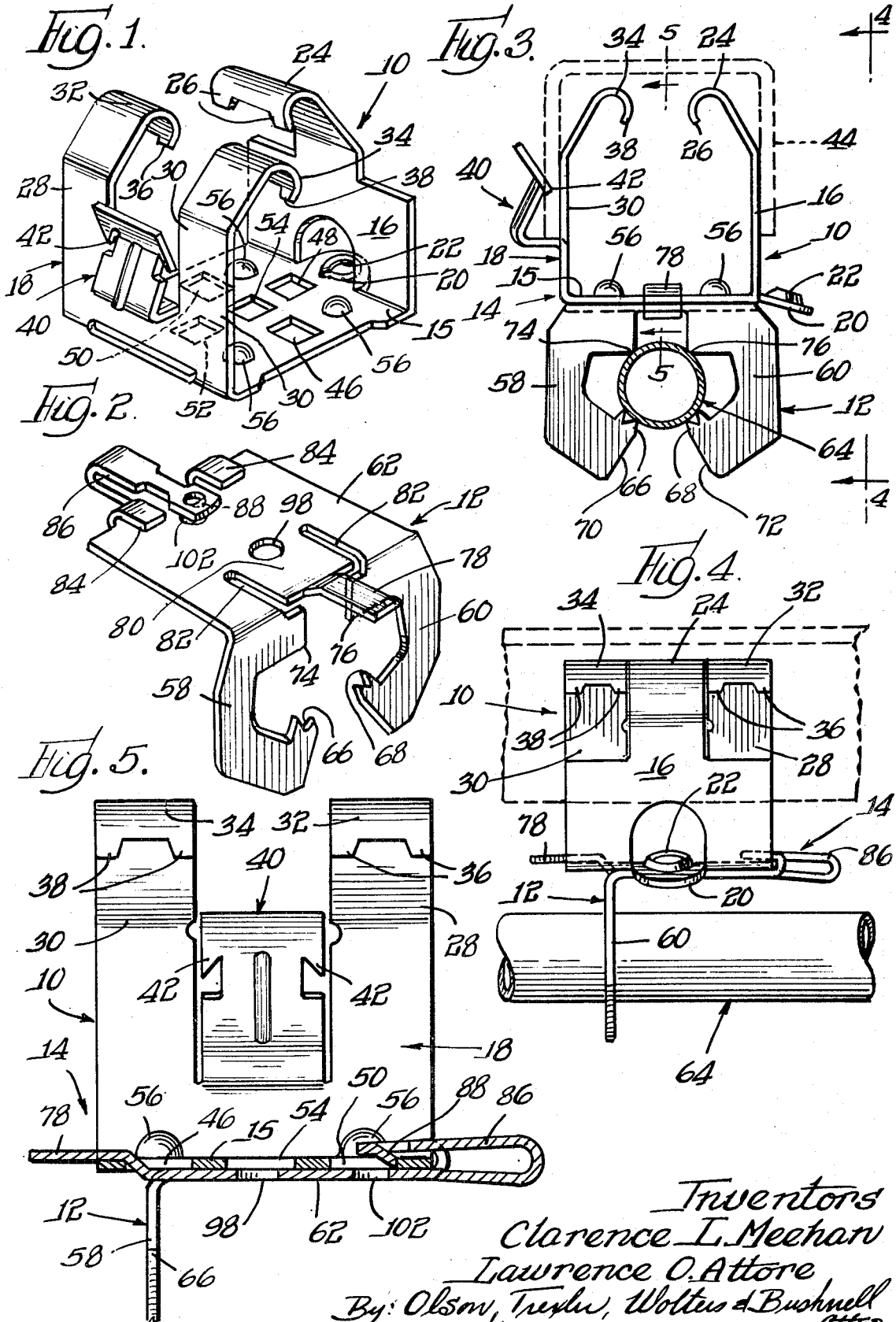
Inventors
Clarence L. Meehan
Lawrence O. Attore
By: Olson, Trexler, Wolters & Bushnell
attys.

Oct. 27, 1970     C. L. MEEHAN ET AL     3,536,281
BRACKET STRUCTURE
Filed Jan. 4, 1968     2 Sheets-Sheet 2
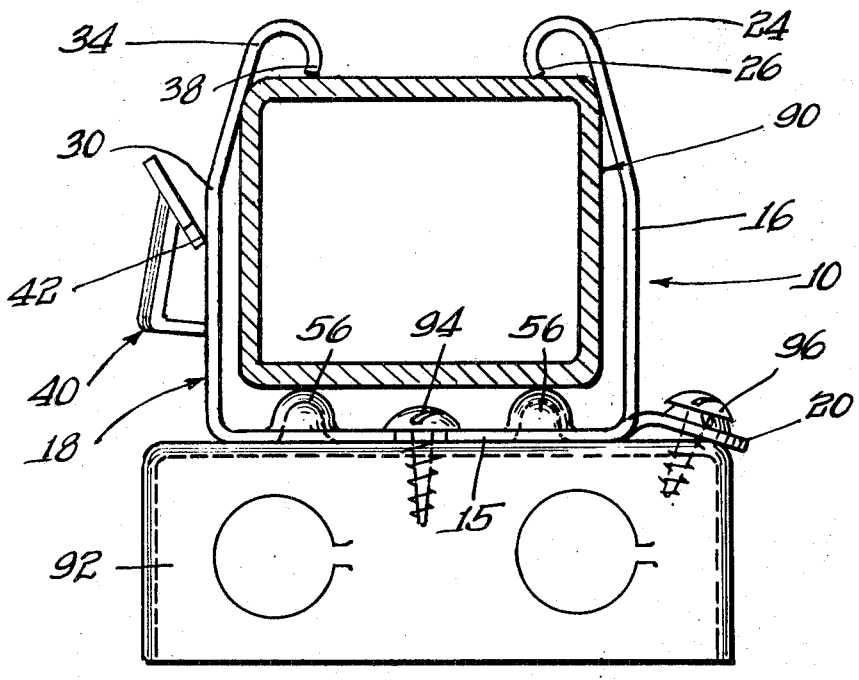
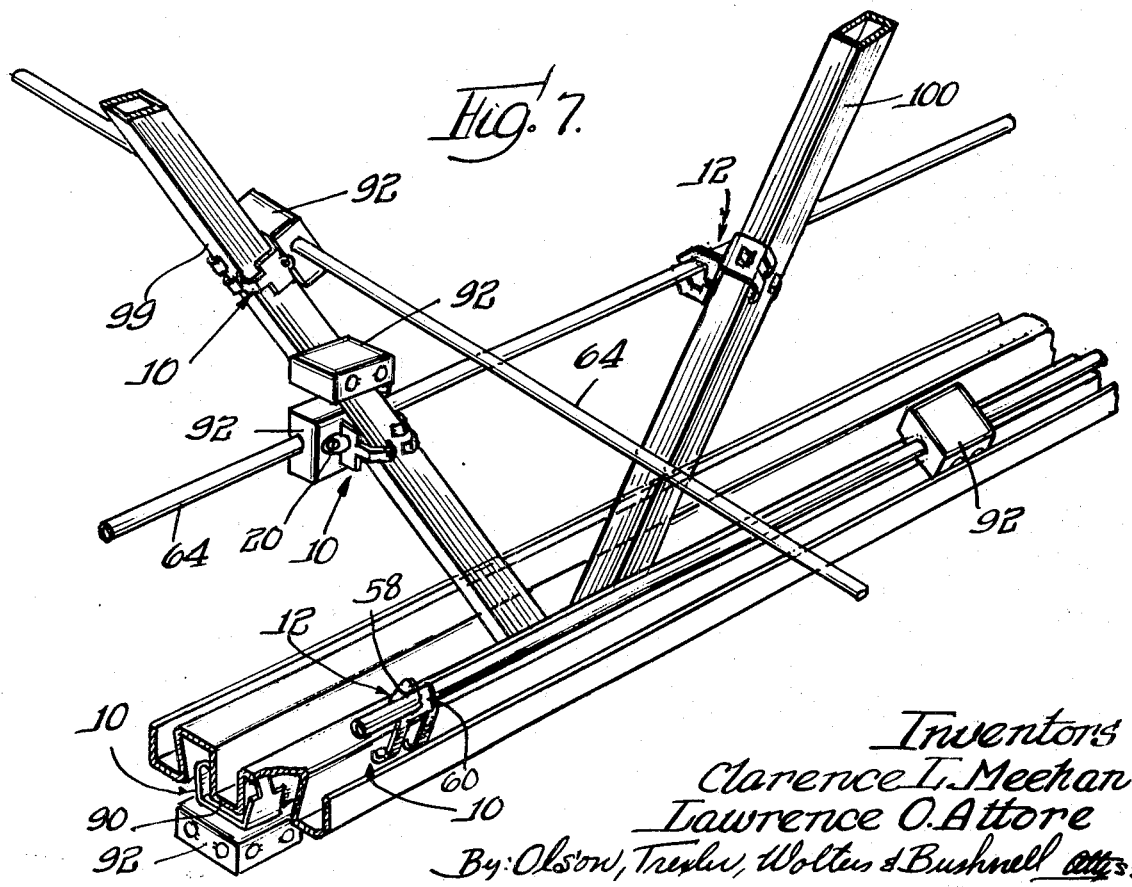
Inventors
Clarence L. Meehan
Lawrence O. Attore
By: Olson, Trexler, Wolters & Bushnell United States Patent Office 3,536,281
Patented Oct. 27, 1970

1

3,536,281
BRACKET STRUCTURE
Clarence L. Meehan, Itasca, and Lawrence O. Attore, Des Plaines, Ill., assignors to Illinois Tool Works Inc., Chicago, Ill., a corporation of Delaware
Filed Jan. 4, 1968, Ser. No. 695,667
Int. Cl. F16l 3/02
U.S. Cl. 248—73
12 Claims

ABSTRACT OF THE DISCLOSURE

A bracket arrangement for mounting pipe or the like to a support member, comprising a pair of interconnectable spring steel bracket members. A first one of the bracket members is generally U-shaped, including a base portion and a pair of leg members extending therefrom. The leg members include gripping finger portions and a barbed tab member for attaching the bracket arrangement to a support member. The second one of the bracket members is generally L-shaped, having a first and second leg member. The first leg member includes a tongue portion, a pair of reverse bent arms and a locking strap which, through apertures located in the base portion of the first bracket member, are used to interconnect the two bracket members. The second leg members of the second bracket member includes a pair of opposing arm portions for securing therebetween a pipe to be mounted on the support member.

BACKGROUND OF THE INVENTION

In the building of new homes, office buildings, etc., there continually arises the need for a simple, efficient arrangement for mounting water pipe, electrical conduit, or other related components used therewith. Presently, these components and pipes are mounted by means of screws or hangers, respectively, the latter of which are screwed or bolted to support beams or the like of the building and which, in turn, carry the pipe throughout the building. Often, however, a pipe or electrical conduit or outlet box connected thereto must be shifted so that a connection may be made, and the above-mentioned hangers, etc., are difficult to move to accommodate this shifting. Consequently, when a pipe must be moved, the hangers are removed from the support structure to which they are fastened and refastened at different places or positions.

SUMMARY OF THE INVENTION

Accordingly, it is a general object of this invention to provide new and improved apparatus for securely hanging conduit, pipe and other components used therewith in a simple, efficient manner, so that the pipe or component once in position may be easily adjustable and movable.

It is a specific object of this invention to provide a bracket arrangement for supporting pipe, conduit and the like which, in a simple snap-on manner, may be fastened to a support structure of the building to which the pipe is being attached.

It is yet another object of this invention to provide a pair of interconnectable bracket members, one of which may be connected to a support structure in a building and the other of which is provided with connecting means for holding a pipe or conduit.

It is a further object of this invention to provide a bracket arrangement as described above wherein one of the two bracket members may be used individually to support a pipe or conduit or component from a support structure.

It is a further object of this invention to provide a bracket arrangement or structure wherein a pipe may be held and rotated therein about a one hundred degree arc.

It is still another object of this invention to provide a bracket arrangement for holding pipe, or the like, wherein said bracket arrangement may be snapped onto a support structure, and wherein the pipe being held thereby may be snapped into connection with said bracket.

It is yet another object of this invention to provide a bracket structure of the above-described type wherein the bracket members comprising the arrangement are constructed in one piece at a low cost and with a minimum of material.

A better understanding of the present invention and its organization and construction may be had by referring to the description below in conjunction with the accompanying drawings, wherein:

FIG. 1 is a perspective view of one of the pair of bracket members of a bracket arrangement or structure representative of one embodiment of the invention;

FIG. 2 is a perspective view of the other of the pair of bracket members of the above-mentioned bracket arrangement;

FIG. 3 is a front view of the bracket arrangement according to the invention being used to secure a pipe or conduit to a support structure;

FIG. 4 is a side view of the bracket arrangement of FIG. 3 taken along the line 4—4 thereof;

FIG. 5 is an enlarged sectional view of the bracket structure of FIG. 3, taken along the line 5—5 of FIG. 3;

FIG. 6 is an enlarged side transverse sectional view of the bracket member of FIG. 1, shown secured to a support member; and FIG. 7 is a perspective view of a number of support members and a plurality of lengths of pipe and related components which are shown fastened to respective support members by means of the bracket structures embodying the present invention.

DETAILED DESCRIPTION

Referring now to the drawings more in detail, wherein like numerals have been employed to designate similar parts in the various views, FIGS. 1 and 2 illustrate a bracket member designated generally by the numeral 10 and a bracket member designated generally by the numeral 12, capable of being combined to present bracket arrangement of structure 14, FIGS. 3 and 4. The bracket member 10 is generally U-shaped and preferably includes a substantially square-shaped base member 15 and leg sections 16 and 18 protruding at generally right angles from opposite edges of the base member 15. The base portion 15 includes, integrally formed therewith, a tab member 20 struck out from the leg section 16 having a helical portion defining a screw-accommodating aperture 22. The free end of leg section 16 is bent or inclined inwardly, and at its free extremity is reversely bent at 24 to form a pair of work engaging teeth 26, FIG. 1.

The other leg section 18 of U-shaped bracket member 10, includes a pair of gripping finger portions 28 and 30 which face inwardly toward the opposite leg section 16. The gripping finger portions 28 and 30 include curved end portions 32 and 34 respectively, each of which provide a pair of teeth 36 and 38. The function of the teeth 26, 36 and 38 will be set forth later in the specification.

Integrally formed with and struck from the center portion of leg section 16, between gripping finger portions 28 and 30, is a tab member 40, the free extremity of which is formed with a pair of barb members 42. It will thus be apparent that when the U-shaped bracket or fastener 10 is inserted within a channel member or support 44 (FIG. 3), the barbs 42 cooperate with the fingers 28 and 30 of the leg section 18 to secure the bracket member 10 against unauthorized separation from the support 44.

The base portion 15 of the U-shaped member 10 has therein four rectangularly shaped apertures 46, 48, 50 and 52. In addition to the rectangular apertures just mentioned, a square-shaped aperture 54 at the center of base portion 15 is provided. Four protuberances 56 extend outwardly from the plate or base 15. The purpose of these protuberances will be explained later in the specification.

FIG. 2 of the drawings illustrates the bracket member 12 which, as mentioned above, is adapted to be coupled with the bracket member 10 to form a combined unit or structure 14. The member 12 is L-shaped and includes a pair of spaced leg portions 58 and 60 which are formed integral with and extend at substantially right angles to the plate or base portion 62. The plate portion 62 is substantially square in shape and conforms generally in size and shape with the previously mentioned base portion or plate 15 of bracket 10. As will hereinafter be explained, the plate portion 62 of the bracket member 12 is adapted to underlie and be attached to the plate member 15.

As seen in FIGS. 2 and 3, the leg portions 58 and 60 are generally C-shaped and provide a pair of jaws designed to accommodate a cylindrical member such as a conduit or pipe 64 (FIG. 3). The free extremities of the C-shaped leg portions 58 and 60 are provided with sharp, work-engaging teeth 66 and 68, respectively. Edge margins 70 and 72, provided at the extremities of the legs 58 and 60 respectively, flare outwardly as shown clearly in FIGS. 2 and 3, so as to facilitate reception of the cylindrical workpiece or conduit 64. After the jaws provided by the legs 58 and 60 have been snapped over the periphery of the cylindrical workpiece or conduit 64, the sharp barbs or teeth 66 and 68 impinge the periphery of the member 64 and force the oppositely disposed peripheral area of the member 64 against the corners 74 and 76 of the leg portions 58 and 60.

The structure associated with the plate 62 for coupling said plate with the underside of the plate 15 of bracket 10 will now be described. This coupling structure includes a tongue 78 projecting beyond the line of juncture of the legs 58-60 with the plate 62, see FIG. 2. The tongue 78 forms an integral extension of a wider tongue base 80, defined by slots or slits 82 formed in the plate member 62. It will be noted that the tongue portion 78 is coincident with a plane substantially parallel to but spaced slightly from the plane of the wider tongue portion 80 and plate 62.

Referring now to the opposite margin of the plate 62, it will be noted that a pair of spaced tabs or fingers 84 are provided which superimpose and are spaced from the upper surface of the plate 62. The spacing of the fingers 84 from the upper surface of the plate 62 is sufficient to accommodate a complementary margin of the base or plate member 15 of the bracket member 10. Interposed between the fingers 84 is an elongate member or arm 86 formed integral with the margin of the plate 62. This arm 86 is in the nature of a reversely bent element, the free extremity of which overlies the upper surface of the plate 62 and is provided with a struck-out latch member 88. The bent back portion of the elongated arm 86, as viewed in FIGS. 4 and 5, is spaced sufficiently from the upper surface of the plate member 62 with which it is integrally formed to accommodate the portion of the plate 15 extending between the fingers 84.

With the foregoing description in mind, it will be appreciated that the bracket member 12 may be coupled with the bracket member 10 by first positioning the plate member 62 of the bracket 12 beneath the plate 15 of the bracket 10, and so moving the parts as to bring about the telescopic association of the tongue 78 with the rectangular aperture 46 in the plate 15. After this has been accomplished, the plate 62 may be moved into engagement with the undersurface of the plate 15 and moved to the left as illustrated in FIGS. 4 and 5. Such relative movement of the parts is limited by the presence of the portions of the fingers 84 at the adjacent margin of the plate 62. As this limiting position of the parts takes place, the latch member 88 carried by the free extremity of the reversely bent finger member 86 becomes automatically latched or interlocked within the plate aperture 50 and engages one edge or margin of the stock of the plate 15 which defines the aperture 50, FIG. 5. With the brackets 10 and 12 thus coupled, they may now be handled as a single unit or bracket arrangement previously identified by the numeral 14, FIG. 3.

The bracket arrangement or structure 14, comprising the coupled brackets 10 and 12, may be attached to a support member such as the previously mentioned channel support member 44. This is accomplished by merely inserting the bracket member 10 into the open side of the channel as heretofore described. The bracket member 10 may also be coupled with a support member or frame which may be inserted between the free extremities of the leg structures 16 and 18. FIG. 6 illustrates the manner in which a support member 90 may be inserted between the leg structures 16 and 18 so as to cause the free extremities thereof to be urged outwardly away from each other. In such instances, the teeth 26 of the leg structure and the oppositely disposed teeth 36 and 38 of the fingers 28 and 30 respectively, are brought to bear against the opposed outer surfaces of the support member 90. By this arrangement, the bracket assembly 14 is fastened securely to the member 90 to prevent unauthorized removal.

There are instances, such as illustrated in FIGS. 6 and 7, where only the single bracket member 10 is to be secured to a supporting structure. In FIG. 6, the underside of the plate 15 of the bracket 10 is secured to an outlet box 92. A fastening screw member 94 may be inserted through the central aperture 54 of the plate or base member 15, and threaded within a complementary aperture provided in the wall of the outlet box 92. In such applications, it may be desirable to use an additional fastening screw member 96, which may be tightened within the struck-out helix which defines the aperture 22 in the tab 20.

The bracket member 12 may also be employed independently of the bracket member 10. In such instances, a central aperture 98 in the plate 62 is adapted to accommodate a screw member for fastening the plate 62 to the complementary surface of a supporting element or channel. Attention is directed to the fact that the protuberances 56 of the base plate 50 limit the extent to which a flat surface of a channel or other type supporting member may approach the plane of the plate or base member 15. Thus, as illustrated in FIG. 6, when the channel or support member indicated by the dotted lines of FIG. 6 is housed within the space provided between the leg portions 16 and 18, the protuberances 56 serve as spacer members to assure sufficient space above the surface of the base plate 15 for accommodation of the reversely bent arm or finger 86. Thus, if the protuberances or their equivalent were not present, the bottom surface of the supporting channel member would interfere with the application to or disassociation from the bracket 10 of the bracket member 12.

FIG. 7 is a perspective view of various frame members of the type adapted to support bracket structures of the character contemplated by the present invention. As illustrated in FIG. 7, electrical conduits 64 may be connected with outlet boxes 92 and these outlet boxes may be secured to other types of supporting frame members. Because of the structural arrangement of the conduit gripping leg members 58 and 60 of the bracket 12, it is possible after the conduit 64 has been associated therewith to shift or pivot the conduit through at least 100° without disturbing the frictional grip of the teeth 66 and 68 against the periphery of the conduit. Thus brackets conforming with the structure of bracket member 12 greatly facilitate the ease with which the conduit 64 associated therewith, may be laterally shifted, the biting teeth 64, 68, 74 and 76 providing the fulcrum about which the conduit may be pivoted within predetermined limits. The structural design of the gripping fingers of bracket 10 and the jaw-like work-gripping elements varying widely in cross-sectional shape. In other words, the supporting member with which the bracket member is associated may be polygonal in cross-section, as illustrated by the elongated supporting member 90, and supporting members 99 and 100 of rectangular or square cross-section. In addition, the bracket members contemplated by the present invention are adapted to accommodate elongating support members having curved peripheral surfaces, such as the previously mentioned electrical conduits 64. While the bracket member 10, as illustrated in FIG. 3, may be mounted within an open-sided channel member 44, it is conceivable that the bracket member could be coupled with one leg of a channel member.

From the foregoing, it will be appreciated that the present invention contemplates bracket structures which may be stamped and formed from sheet metal by the practice of conventional stamping methods. The two bracket members 10 and 12 may be used independently of each other or as a preassembled unit. In the drawings the bracket 12 is shown in only one position of attachment to the bracket 10. It should be understood that the bracket 12 could be turned 180° and applied to the plate 15 of the bracket 10 with equal facility. In fact, all of the rectangular apertures in the base plate 15 are adapted to be used for coupling the bracket member 12 to said base plate. Thus the bracket member 12 may be coupled with the plate 15 of the bracket member 10 in various positions so as to accommodate elongate supporting members of varying cross-sectional shapes such as polygonal and circular, extending in various directions.

An aperture 102, in the base plate 62 is provided to accommodate a tool (not shown) for disengaging the latch member 38 in instances where it is desired to separate the bracket members 10 and 12. Having the teeth or barbs 42 of the struck out tab member 40 formed at the lower corners of a plate member disposed at an acute angle with an arm inclined inwardly, as shown in FIGS. 1 and 3, increases the impinging effectiveness of the barbs.

As disclosed in the drawings, the jaw-like leg portions 58 and 60 are so designed as to accommodate conduits of varying diameter. Thus the barbs 66 and 68 of these leg portions may be engaged for locking impingement with the peripheral surface of relatively large conduits. The presence of the corners 74 and 76 assure engagement with relatively small diameter conduits or workpieces, and the flexibility of the legs 58–60 assure the efficient locking impingement of the barbs 66–68 with conduits of greater diameter.

It will be obvious to one skilled in the art that changes and modifications may be made without departing from the invention in its broadest aspects and therefore the aim in the appended claims is to cover all such changes and modifications as come within the true spirit and scope of the invention.

The invention is claimed as follows:

1. A bracket arrangement for mounting conduits and the like including a bracket member having a plate-like base, spaced leg members integral with and extending laterally of said base for accommodating an elongate channel-like support member, said leg members comprising at least two laterally spaced and oppositely disposed laterally yieldable leg members, the free extremities of said leg members being provided with teeth for lockingly impinging the external surface of a bracket support such as a channel-like member, and means associated with said plate-like base for detachably interlocking said base with a complementary plate-like base of a second bracket member.

2. A bracket arrangement as set forth in claim 1, wherein the tooth means is located upon a section struck out from at least one of said leg members for bitingly impinging the external surface of a bracket support such as a channel-like member.

3. A bracket arrangement as set forth in claim 1, wherein barb means is associated with and spaced from the free extremity of at least one of said leg members for bitingly impinging the external surface of a bracket support such as a channel-like member.

4. A bracket arrangement as set forth in claim 1, wherein the free extremities of said leg members are reversely bent, said reversely bent extremities having teeth for bitingly impinging the external surface of a channel-like bracket support.

5. A bracket arrangement for mounting conduits and the like as set forth in claim 1, wherein abutment means is associated with at least one leg member for limiting the extent to which the spaced members may traverse said external surfaces of the channel-like member.

6. A bracket arrangement for mounting conduits and the like, including a bracket member having a plate-like base, support engageable leg members integral with and extending laterally from a margin of said base, said leg members being in the form of jaw members facing edge to edge in spaced relation and adapted to receive a workpiece grippingly therebetween, as for example a conduit, tooth means on said jaws for bitingly impinging oppositely disposed surfaces of said workpiece and means associated with said plate-like base for detachably interlocking with a complementary plate-like base of a second bracket member, said detachable interlocking means including tongue means extending from one margin of said plate-like base for interlocking with a complementary coupling portion of said second bracket member, and latch means oppositely disposed from said tongue means for interlocking with a complementary section of a second bracket member.

7. A bracket arrangement as set forth in claim 6, wherein the latch means includes a reversely bent section and finger means for overlying a complementary plate-like base of a second bracket member.

8. A bracket arrangement as set forth in claim 6, wherein latching means is in the form of an elongated reversely bent arm extending in substantial parallelism with the tongue means, the free extremity of said arm adapted to interlock with a complementary plate-like base for securing said bases against unauthorized separation.

9. A bracket arrangement for mounting conduits and the like including a bracket member having a plate-like base, support engageable leg means integral with and extending laterally of said base, tooth means associated with said leg means for impinging the external surface of a bracket support, a second bracket member having a plate-like base, support engageable leg means integral with and extending laterally from one margin of said base, said last mentioned leg means being in the form of jaws adapted to grippingly receive therebetween a workpiece, as for example a conduit, tooth means associated with said jaws for gripping oppositely disposed portions of a workpiece, and means detachably interlocking said plate-like bases.

10. A bracket arrangement as set forth in claim 9, wherein the means detachably interlocking said bases include tongue means on one base and aperture means in the other base interlocking with said tongue means to thereby couple said bases against unauthorized separation.

11. A bracket arrangement as set forth in claim 9, wherein the means detachably interlocking said bases include latching means on one plate overlying and interlocking with the other plate-like base for securing said bases against unauthorized separation.

12. A bracket arrangement as set forth in claim 9, wherein the jaws of said second-mentioned bracket extend from one margin of said second plate-like base and are disposed in edge to edge facing relation for receiving a bracket support between said edges.

References Cited

UNITED STATES PATENTS

| | | | |
|---|---|---|---|
| 2,746,110 | 5/1956 | Bedford | 248—68 X |
| 1,277,479 | 9/1918 | Ritchie | 24—81 |
| 2,467,604 | 4/1949 | Tinnerman | 287—189.35 |
| 2,968,850 | 1/1961 | Tinnerman | 24—81 |
| 2,972,494 | 2/1961 | Dominic | 24—81 X |
| 2,996,570 | 8/1961 | Wilson | 248—72 X |
| 3,004,370 | 10/1961 | Tinnerman | 24—81 X |
| 3,131,447 | 5/1964 | Tinnerman | 24—81 |

FOREIGN PATENTS 885,372  12/1961  Great Britain.

CHANCELLOR E. HARRIS, Primary Examiner

U.S. Cl. X.R.

24—83; 248—221, 223